(12) United States Patent
Kolmykov-Zotov et al.

(10) Patent No.: US 8,502,804 B2
(45) Date of Patent: Aug. 6, 2013

(54) TARGETING IN A STYLUS-BASED USER INTERFACE

(75) Inventors: Alexander J. Kolmykov-Zotov, Sammamish, WA (US); Emily K. Rimas-Ribikauskas, Seattle, WA (US); Philip Ti-Fei Su, Kirkland, WA (US); Reed L. Townsend, Seattle, WA (US); Robert J. Jarrett, Snohomish, WA (US); Steven P. Dodge, Sammamish, WA (US)

(73) Assignee: Microsoft Corporation, Redmond, WA (US)

( * ) Notice: Subject to any disclaimer, the term of this patent is extended or adjusted under 35 U.S.C. 154(b) by 356 days.

(21) Appl. No.: 12/772,644

(22) Filed: May 3, 2010

(65) Prior Publication Data

US 2010/0207904 A1 Aug. 19, 2010

Related U.S. Application Data

(63) Continuation of application No. 11/085,192, filed on Mar. 22, 2005, now Pat. No. 7,728,825.

(51) Int. Cl.
*G06F 3/033* (2013.01)

(52) U.S. Cl.
USPC .......................................................... 345/179

(58) Field of Classification Search
USPC .................................. 345/156, 157, 173, 179
See application file for complete search history.

(56) References Cited

U.S. PATENT DOCUMENTS

2006/0161846 A1 * 7/2006 Van Leeuwen ............... 715/702

* cited by examiner

*Primary Examiner* — Yong H Sim
(74) *Attorney, Agent, or Firm* — Shook Hardy & Bacon LLP

(57) ABSTRACT

Aspects of the invention provide virtual hover zones. When a user lowers a hovering stylus while remaining within a hover zone, cursor control is modified to be more easily controllable by the user. If the user pauses the stylus in mid-air before lowering the stylus, and if the stylus remains within the hover zone, then upon touchdown the cursor may be moved to the projection of the location where the stylus was paused. Any action that may be taken in response to the touch down may be sent to the projection location as well. Also provided are cursor control zones. A dampening zone may be used to provide dampened cursor movement feedback in response to movement input provided by a pointing device. Also, a dead zone may be used to prohibit cursor movement in response to movement input provided by the pointing device.

17 Claims, 6 Drawing Sheets

TARGETING IN A STYLUS-BASED USER INTERFACE

CROSS REFERENCE TO RELATED APPLICATIONS

This application is a continuation application of U.S. application Ser. No. 11/085,192, which was filed on Mar. 22, 2005. U.S. application Ser. No. 11/085,192 is incorporated herein by reference.

FIELD OF THE INVENTION

Aspects of the present invention are directed to improvements in targeting displayed objects in a stylus-based user interface of a computing device.

BACKGROUND OF THE INVENTION

Touch-sensitive surfaces are rapidly becoming more common in computing devices. They are very convenient as they allow a user to make natural gestures familiar to the user in other contexts, such as by entering handwriting using a special stylus such as an elongated pen-like object having a pointed tip. The term touch-sensitive surface or device will be used herein to refer to such surfaces or devices, such as digitizers that may be separate from or integral with a display, that are configured to detect the touch of a stylus. The term "stylus" as used throughout herein includes any type of stylus such as a specially-designed stylus device (e.g., a pen) or even a user's finger. Various touch-sensitive surfaces provide for a hover function, meaning that the touch-sensitive surface is capable of detecting the presence of the stylus without the stylus actually touching the touch-sensitive surface. For example, some touch-sensitive devices can detect the presence of a stylus within approximately 2 centimeters of their touch-sensitive surfaces. This is referred to as hovering with the stylus. This capability may allow the user to position the cursor over an area prior to taking an action such as generating a left mouse button down command, also known as a left click. Hovering with a stylus is similar to moving the cursor using a mouse, and pressing down with the stylus (e.g., by tapping the stylus on the surface of the touch-sensitive device) is similar to pressing the left or right buttons of the mouse.

However, precise targeting using a stylus and touch-sensitive surface can sometimes be difficult, especially where accuracy is important. For example, if a user desires to tap a stylus on, a particular point of a touch-sensitive display device, the user may receive feedback in the form of a displayed cursor that follows the movements of the stylus while it is hovering and prior to the tap. This allows the user to see where the intended tap location will be. However, as the stylus approaches the touch-sensitive device and eventually comes into contact with it, the actual tap location may differ from the intended location. Small targets, parallax, poor digitizer quality, and shaky hands can contribute to such targeting difficulties.

Accordingly, there is a need for ways to overcome, counteract, or minimize such targeting difficulties.

SUMMARY OF THE INVENTION

Aspects of the present invention are directed to providing ways for users to more accurately control a graphical user interface using a pointing device such as a stylus and touch-sensitive device.

Aspects of the invention provide virtual hover zones, wherein when a user lowers a hovering stylus-while remaining within a hover zone, cursor control is modified to be more easily controllable. The hover zone may be conceptualized as a three-dimensional volume, such as a cone or cylinder, extending between the tip of the stylus and the touch-sensitive surface. If the user pauses the stylus in mid-air before lowering the stylus, and if the stylus remains within the hover zone until it touches down on the touch-sensitive surface of a touch-sensitive device, then the cursor location may be moved to the projection of the location where the stylus was paused. Any action that may be taken in response to the touch down may be sent to the projection location as well.

Aspects of the invention further provide for various cursor control zones. In particular, a dampening zone may be used to provide dampened cursor movement feedback in response to movement input provided by a stylus or other pointing device. Also, a dead zone may be used to prohibit cursor movement in response to movement input provided by the stylus or other pointing device.

These and other aspects of the invention will be apparent upon consideration of the following detailed description of illustrative embodiments.

BRIEF DESCRIPTION OF THE DRAWINGS

The foregoing summary of the invention, as well as the following detailed description of illustrative embodiments, is better understood when read in conjunction with the accompanying drawings, which are included by way of example, and not by way of limitation with regard to the claimed invention.

DETAILED DESCRIPTION OF ILLUSTRATIVE EMBODIMENTS

Figure 1:
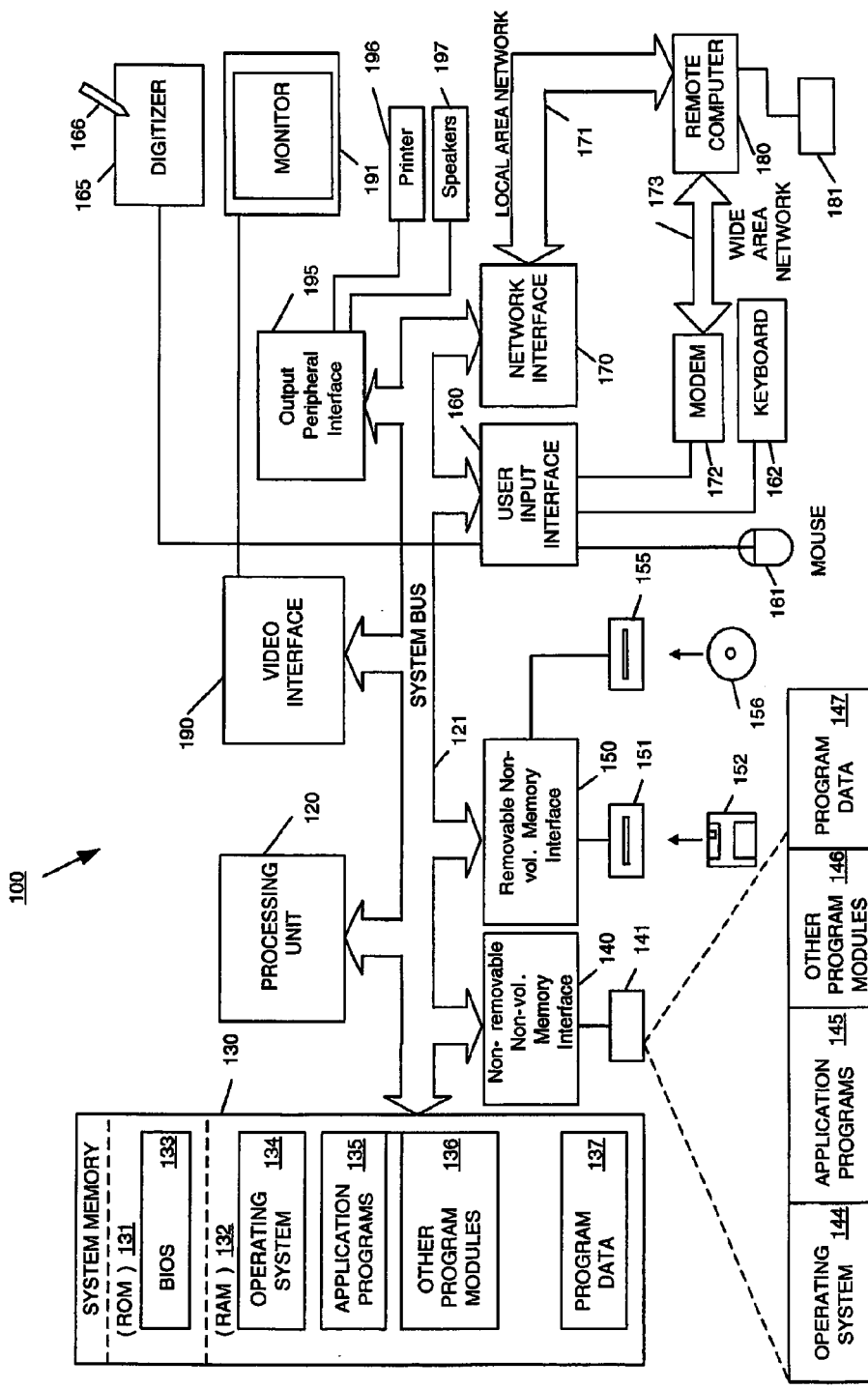
FIG. 1 is a functional block diagram of an illustrative computer that may be used to implement various aspects of the present invention.

FIG. 1 illustrates an example of a suitable computing system environment 100 in which aspects of the invention may be implemented. Computing system environment 100 is only one example of a suitable computing environment and is not intended to suggest any limitation as to the scope of use or functionality of the invention. Neither should computing system environment 100 be interpreted as having any dependency or requirement relating to any one or combination of components illustrated in illustrative computing system environment 100.

The invention is operational with numerous other general purpose or special purpose computing system environments or configurations. Examples of well known computing systems, environments, and/or configurations that may be suitable for use with the invention include, but are not limited to, personal computers (PCs); server computers; hand-held and other portable devices such as personal digital assistants (PDAs), tablet PCs or laptop PCs; multiprocessor systems; microprocessor-based systems; set top boxes; programmable consumer electronics; network PCs; minicomputers; mainframe computers; distributed computing environments that include any of the above systems or devices; and the like.

Aspects of the invention may be described in the general context of computer-executable instructions, such as program modules, being executed by a computer. Generally, program modules include routines, programs, objects, components, data structures, etc. that perform particular tasks or implement particular abstract data types. The invention may also be operational with distributed computing environments where tasks are performed by remote processing devices that are linked through a communications network. In a distributed computing environment, program modules may be located in both local and remote computer storage media including memory storage devices.

With reference to FIG. 1, illustrative computing system environment 100 includes a general purpose computing device in the form of a computer 100. Components of computer 100 may include, but are not limited to, a processing unit 120, a system memory 130, and a system bus 121 that couples various system components including system memory 130 to processing unit 120. System bus 121 may be any of several types of bus structures including a memory bus or memory controller, a peripheral bus, and a local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, Advanced Graphics Port (AGP) bus, and Peripheral Component Interconnect (PCI) bus, also known as Mezzanine bus.

Computer 100 typically includes a variety of computer-readable media. Computer readable media can be any available media that can be accessed by computer 100 such as volatile, nonvolatile, removable, and non-removable media. By way of example, and not limitation, computer-readable media may include computer storage media and communication media. Computer storage media may include volatile, nonvolatile, removable, and non-removable media implemented in any method or technology for storage of information such as computer-readable instructions, data structures, program modules or other data. Computer storage media includes, but is not limited to, random-access memory (RAM), read-only memory (ROM), electrically-erasable programmable ROM (EEPROM), flash memory or other memory technology, compact-disc ROM (CDROM), digital video disc (DVD) or other optical disk storage, magnetic cassettes, magnetic tape, magnetic disk storage or other magnetic storage devices, or any other medium which can be used to store the desired information and which can accessed by computer 100. Communication media typically embodies computer-readable instructions, data structures, program modules or other data in a modulated data signal such as a carrier wave or other transport mechanism and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, radio frequency (RF) (e.g., BLUETOOTH, WiFi, UWB), optical (e.g., infrared) and other wireless media. Any single computer-readable medium, as well as any combination of multiple computer-readable media, are both intended to be included within the scope of the term "computer-readable medium" as used herein.

System memory 130 includes computer storage media in the form of volatile and/or nonvolatile memory such as ROM 131 and RAM 132. A basic input/output system (BIOS) 133, containing the basic routines that help to transfer information between elements within computer 100, such as during start-up, is typically stored in ROM 131. RAM 132 typically contains data and/or program modules that are immediately accessible to and/or presently being operated on by processing unit 120. By way of example, and not limitation, FIG. 1 illustrates software in the form of computer-executable instructions, including operating system 134, application programs 135, other program modules 136, and program data 137.

Computer 100 may also include other computer storage media. By way of example only, FIG. 1 illustrates a hard disk drive 141 that reads from or writes to non-removable, nonvolatile magnetic media, a magnetic disk drive 151 that reads from or writes to a removable, nonvolatile magnetic disk 152, and an optical disk drive 155 that reads from or writes to a removable, nonvolatile optical disk 156 such as a CD-ROM, DVD, or other optical media. Other computer storage media that can be used in the illustrative operating environment include, but are not limited to, magnetic tape cassettes, flash memory cards, digital video tape, solid state RAM, solid state ROM, and the like. Hard disk drive 141 is typically connected to system bus 121 through a non-removable memory interface such as an interface 140, and magnetic disk drive 151 and optical disk drive 155 are typically connected to system bus 121 by a removable memory interface, such as an interface 150.

The drives and their associated computer storage media discussed above and illustrated in FIG. 1 provide storage of computer-readable instructions, data structures, program modules and other data for computer 100. In FIG. 1, for example, hard disk drive 141 is illustrated as storing an operating system 144, application programs 145, other program modules 146, and program data 147. Note that these components can either be the same as or different from operating system 134, application programs 135, other program modules 136, and program data 137, respectively. Operating system 144, application programs 145, other program modules 146, and program data 147 are assigned different reference numbers in FIG. 1 to illustrate that they may be different copies. A user may enter commands and information into computer 100 through input devices such as a keyboard 162 and a pointing device 161, commonly referred to as a mouse, trackball or touch pad. Such pointing devices may provide pressure information, providing not only a location of input, but also the pressure exerted while clicking or touching the device. Other input devices (not shown) may include a microphone, joystick, game pad, satellite dish, scanner, or the like. These and other input devices are often coupled to processing unit 120 through a user input interface 160 that is coupled to system bus 121, but may be connected by other interface and bus structures, such as a parallel port, game port, universal serial bus (USB), or IEEE 1394 serial bus (FIREWIRE). A monitor 191 or other type of display device is also coupled to system bus 121 via an interface, such as a video interface 190. Video interface 190 may have advanced 2D or 3D graphics capabilities in addition to its own specialized processor and memory.

Computer 100 may also include a touch-sensitive device 165, such as a digitizer, to allow a user to provide input using a stylus 166. Touch-sensitive device 165 may either be integrated into monitor 191 or another display device, or be part of a separate device, such as a digitizer pad. Computer 100 may also include other peripheral output devices such as speakers 197 and a printer 196, which may be connected through an output peripheral interface 195.

Computer 100 may operate in a networked environment using logical connections to one or more remote computers, such as a remote computer 180. Remote computer 180 may be a personal computer, a server, a router, a network PC, a peer device or other common network node, and typically includes many or all of the elements described above relative to computer 100, although only a memory storage device 181 has been illustrated in FIG. 1. The logical connections depicted in FIG. 1 include a local area network (LAN) 171 and a wide area network (WAN) 173, but may also or alternatively include other networks, such as the Internet. Such networking environments are commonplace in homes, offices, enterprise-wide computer networks, intranets and the Internet.

When used in a LAN networking environment, computer 100 is coupled to LAN 171 through a network interface or adapter 170. When used in a WAN networking environment, computer 100 may include a modem 172 or another device for establishing communications over WAN 173, such as the Internet. Modem 172, which may be internal or external, may be connected to system bus 121 via user input interface 160 or another appropriate mechanism. In a networked environment, program modules depicted relative to computer 100, or portions thereof, may be stored remotely such as in remote storage device 181. By way of example, and not limitation, FIG. 1 illustrates remote application programs 182 as residing on memory device 181. It will be appreciated that the network connections shown are illustrative, and other means of establishing a communications link between the computers may be used.

As discussed previously, touch-sensitive device 165 may be a device separate from or part of and integrated with computer 100. In addition, any or all of the features, subsystems, and functions discussed in connection with FIG. 1 may be included in, coupled to, or embodied integrally as part of, a tablet-style computer. For example, computer 100 may be configured as a tablet-style computer a or handheld device such as a PDA where touch-sensitive device 165 would be considered the main user interface. In such a configuration touch-sensitive device 165 may be considered to include computer 100. Tablet-style computers are well-known. Tablet-style computers interpret gestures input to touch-sensitive device 165 using stylus 166 in order to manipulate data, enter text, create drawings, and/or execute conventional computer application tasks such as spreadsheets, word processing programs, and the like. Input may not only be made by stylus 166, but also by other types of styli such as a human finger.

Figures 2, 3:
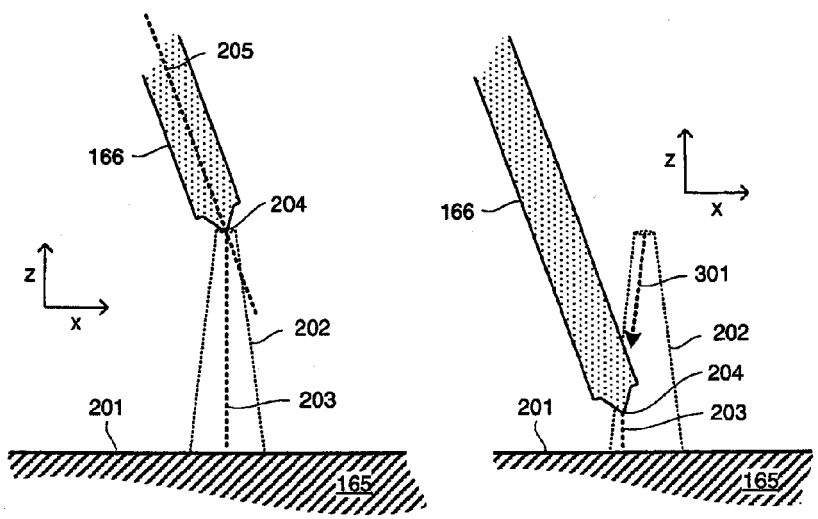
FIGS. 2 and 3 are each side views of an illustrative touch-sensitive device and stylus.
Figure 4:
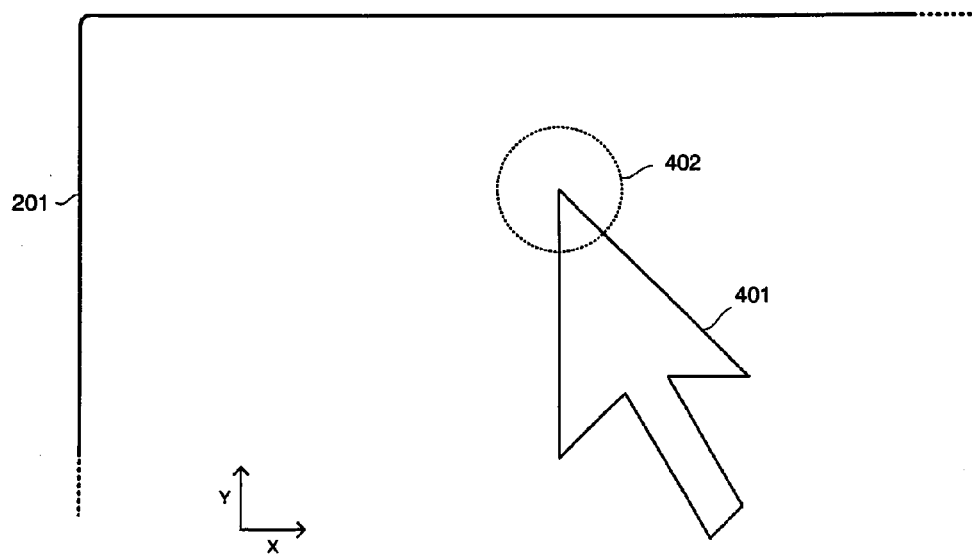
FIG. 4 is a plan view of an illustrative touch-sensitive device integrated with a display.

Referring to FIG. 2, illustrative touch-sensitive device 165 has a surface 201 that will be referred to herein as a touch-sensitive surface. In the following discussion, an X-Y plane will be defined as the plane along which touch-sensitive surface 201 extends (the Y dimension is not shown in the side view of FIG. 2, but is shown in, e.g., FIG. 4). A dimension, called the Z dimension, is defined in the following discussion as the direction normal to the X-Y plane. This coordinate system is arbitrary and is used only for explanatory purposes.

Touch-sensitive device 165 is configured to detect both the physical contact of stylus 166 against touch-sensitive surface 201 as well as the proximity of stylus 166 relative to touch-sensitive surface 201 along the Z dimension. More particularly, stylus 166 may have an overall elongated shape along a lengthwise imaginary axis 205 and may have a tip 204 at one end along axis 205. Axis 205 may be parallel to the Z dimension or it may be at some other angle. The latter case is shown in FIG. 2. Either way, the location of tip 204 may be representative of the location of stylus 166, and so depending upon the embodiment, references herein to the location of stylus 166 include references to the location of representative tip 204. For example, touch-sensitive device 165 may sense when tip 204 physically contacts touch-sensitive surface 201. Touch-sensitive device 165 may further sense whether or not tip 204 is proximate to touch-sensitive surface 201 along the Z dimension, such as within a threshold distance from touch-sensitive surface 201. In addition, touch-sensitive device 165 may be able to sense or otherwise estimate what the actual distance along the Z dimension is between tip 204 and touch-sensitive surface 201. Proximity and/or distance may be measured along, e.g., an imaginary axis 203 extending between tip 204 and touch-sensitive surface 201 along the normal Z dimension.

Also as shown in FIG. 2, an imaginary hover zone 202 is shown between stylus 166 (in particular, tip 204) and touch-sensitive surface 201. Although use of the hover zone will be discussed further below, it will be briefly introduced in connection with FIG. 2. A hover zone is a conceptual tool used to determine whether stylus 166 is or is not located within a particular range of positions. Depending upon whether stylus 166 remains in the hover zone or leaves the hover zone, various actions may be taken. In this particular embodiment, hover zone 202 is a volume having a conic shape, which in this case is a conic section having a smaller radius at tip 204 and a larger radius at touch-sensitive surface 201. However, a hover zone may be a volume having any shape such as but not limited to a cylinder, a box, or even an irregular shape. Also, although hover zone 202 is shown to be generally extending parallel to the Z dimension, it may be dynamically oriented so as to be continuously parallel to axis 205 of stylus 166. In FIG. 2, tip 204, and thus stylus 166, is shown to be within hover zone 202.

In FIG. 2, hover zone 202 is shown as a defined volume having a particular shape. This may work where touch-sensitive device 165 is capable of determining or estimating the actual distance of stylus 166 along normal axis 203. However, in embodiments where touch-sensitive device 165 is capable of only a true/false determination as to whether stylus 166 is proximate to touch-sensitive surface 201, hover zone 202 may be less defined and may be reduced to a projection of the position of stylus 166 along normal axis 203 onto touch-sensitive surface 201, possibly in combination with hover time and/or speed of stylus 166. These embodiments will be discussed further below.

Referring to FIG. 3, which is the same embodiment as FIG. 2, stylus 166 has now moved toward touch-sensitive surface 201 along the Z dimension. Stylus 166 has also moved along the X and/or Y dimensions. In moving stylus 166 along the Z dimension, the additional movement along the X and/or Y dimensions may be intended by the user or that is unintentional, such as due to a shaky hand. In particular, tip 204 has moved in a composite direction and by a distance, as depicted by vector 301, such that tip 204 is now closer to touch-sensitive surface 201 along the Z dimension. Thus, the distance between tip 204 and touch-sensitive surface 201 along axis 203 is shorter. In addition, the movement of stylus 166 as between FIGS. 2 and 3 is such that tip 204 (and thus stylus 166) has remained within hover zone 202. In embodiments where touch-sensitive device 165 is able to detect the three-dimensional position of tip 204, this may be a simple matter of determining the three-dimensional position of tip 204 and comparing it with the volume defined by hover zone 202.

In embodiments where touch-sensitive device 165 is only able to determine whether or not hovering tip 204 is proximate along the Z dimension, as well as its X,Y position, then determining whether tip 204 remains within hover zone 202 may include determining whether axis 203 remains within a defined X,Y area on touch-sensitive surface 201. This defined X,Y area will be referred to herein as a touch zone, and may be the projection of the three-dimensional hover zone along the Z dimension. The potential significance of whether stylus 166 remains within hover zone 202 will be described next.

Figure 5:
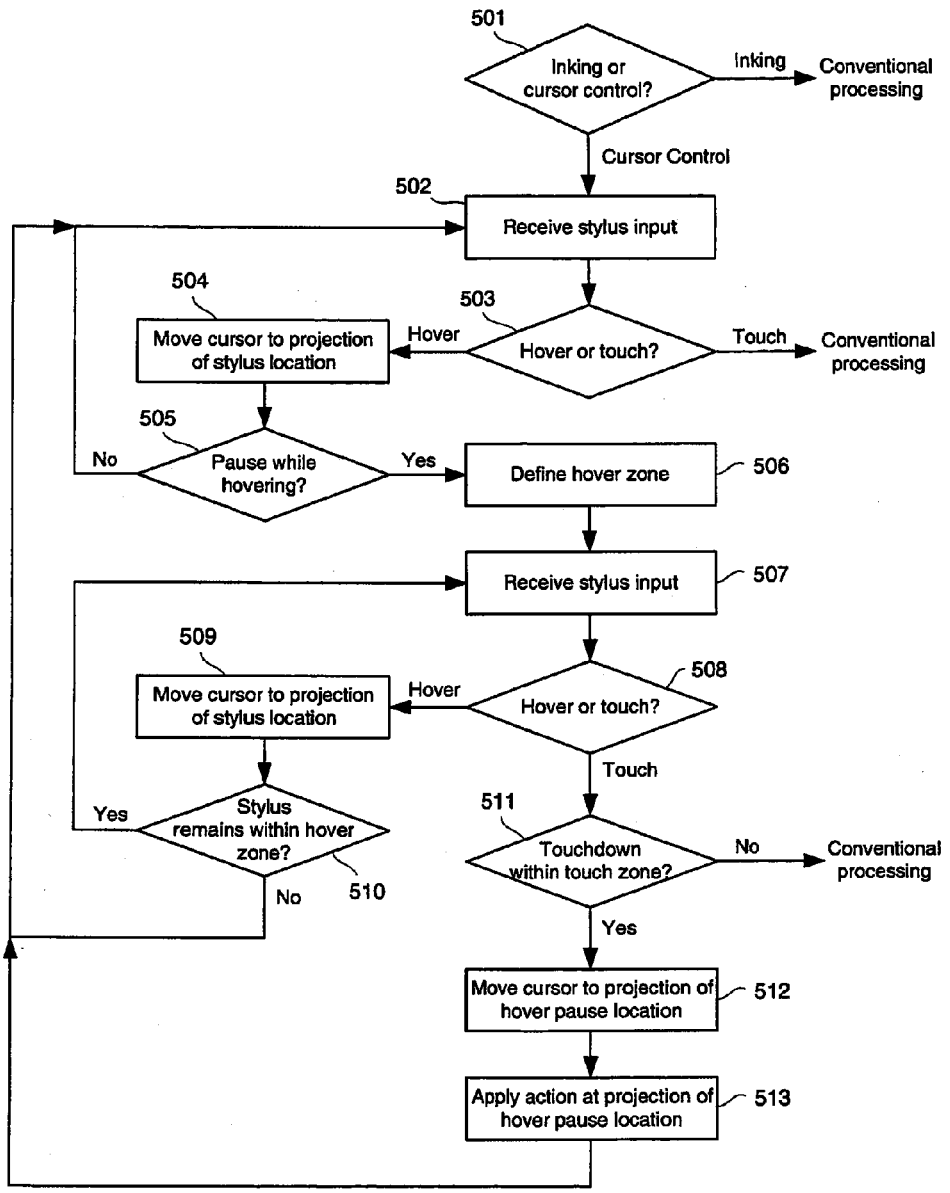
FIGS. 5 and 6 are each a flowchart showing an illustrative method for implementing various aspects of the present invention.

Referring to FIG. 5, an illustrative method is shown that, when implemented by computer 100, may improve targeting by making use of the concept of a hover zone and/or a touch zone. Use of this technique may allow computer 100 to more likely respond as the user intends and expects. In step 501, computer 100 may determine whether it is in an inking mode or a cursor control mode. An inking mode is a mode in which movements of stylus 166 across touch-sensitive surface 201 produce electronic displayed ink. This mode is useful for making handwritten input such as handwritten text or drawings. If computer 100 is in inking mode, then in this embodiment stylus input may be handled as it conventionally would without the present invention. Any of the aspects of the present invention may be used with inking mode, however, they may work more predictably and with better user satisfaction in cursor control mode. Cursor control mode is a mode in which movements of stylus 166 relative to touch-sensitive surface 201 cause a cursor or other object to be moved, or in which other non-inking interactions may occur such as the selection of displayed user interface elements. Also, in cursor control mode, a cursor may not actually be displayed to the user even though a cursor location is tracked by computer 100. The cursor location is the location on the displayed graphical user interface where stylus (or mouse) control is being directed—the location where the cursor would be displayed if it were to be displayed. Where the cursor is not actually displayed, the cursor location may be thought of as a virtual cursor. Where computer 100 does not have distinct inking and cursor control modes, or as desired, step 501 may be skipped or modified.

In the present embodiment, if computer 100 is in cursor control mode, then in step 502 stylus input is received. Stylus input may be broadly classified into two categories: stylus hover input and stylus touch input. Stylus hover input is input where stylus 166 (e.g., tip 204) is hovering proximate to, but not in physical contact with, touch-sensitive surface 201. Stylus hover input includes moving in mid-air or pausing in mid-air. Mid-air movement may be made in any of the X, Y, and/or Z directions. Stylus touch input is input where stylus 166 (e.g., tip 204) is physically in contact with touch-sensitive surface 201. Stylus touch input includes tapping (or double- or triple-tapping) on touch-sensitive surface 201 in a single location, as well as sliding across touch-sensitive surface 201 while maintaining contact with touch-sensitive surface 201. Other types of stylus input may also be made, such as by the user pressing a button on stylus 166 to access special functionality or by simulating a stylus touch input wherein the user physically presses on tip 204 without it actually contacting touch-sensitive surface 201. At step 503, if the stylus input was a stylus touch input (such as where cursor control mode begins while stylus 166 is physically contacting touch-sensitive surface 201), then stylus processing proceeds in a conventional manner. However, if in step 503 it is determined that stylus hover input was instead received, then at step 504 the cursor location (and possibly also a cursor, such as cursor 401 in FIG. 4, displayed at the cursor location, is moved to a location on monitor 191 that corresponds to a Z dimension projection (i.e., a projection along the Z dimension) of stylus 166 (e.g., of tip 204) onto touch-sensitive surface 201. Where touch-sensitive device 165 (and touch-sensitive surface 201) is integrated with monitor 191 as a touch-sensitive display, such as on a tablet-style or handheld computer, then the cursor location (and possibly also the displayed cursor) is moved to the Z dimension projection of stylus 166. For the remainder of this disclosure, it will be assumed that the illustrative embodiments, provide a displayed cursor at the cursor location. However, these embodiments work equally well without an actual displayed cursor. Instead, the cursor location alone may be tracked and modified, and feedback other than a displayed cursor may be provided to the user. For example, objects that are under the present cursor location may "light up" or animate in some manner to give the user an indication of where the cursor location presently is.

Next, at step 505, it is determined whether the stylus hover input is a mid-air pause. A mid-air pause may be used by the user as a signal, or command, to provide information to computer 100 that the pause location is special. The term "pause" as used herein includes a stoppage of all detectable movement of stylus 166 (or just of tip 204) for at least a threshold amount of time. The term "pause" also includes near-stoppage such as the motion of stylus 166 (or just of tip 204) is below a movement threshold for at least a threshold amount of time. For example, computer 100 may consider stylus 166 to be paused if, for at least a threshold amount of time, tip 204 does not move in the X, Y directions and/or in the Z direction more than a threshold distance. The latter situation is included because, as a practical matter, it is difficult if not impossible for a human user to control stylus 166 so as to completely stop all detectable motion. If, at step 505, the stylus hover input does not include a pause, then computer 100 awaits the next stylus input at step 502. If the stylus hover input includes a pause, then at step 506 a hover zone is defined based on the location of stylus 166 during the pause, also referred to herein as the hover pause location.

In defining the hover zone at step 506, the hover zone may be defined to at least partially surround the hover pause location. For example, the hover pause location may be the position of stylus 166 as shown in FIG. 2, and hover zone 202 has been defined as a cone extending radially in the X and Y dimensions about the central hover pause location, and downward in the Z dimension toward touch-sensitive surface 201. As hover zone 202 extends toward touch-sensitive surface 201, the radius of illustrative hover zone 202 in an X,Y plane (also referred to as the X,Y radius) increases about normal axis 203 (which extends between the hover pause location and its Z dimension projection onto touch-sensitive surface 201). For example, at the hover pause location the X,Y radius may be, e.g., one or two pixels in length, whereas at the touch-sensitive surface 201 (Z=0) the X,Y radius of hover zone 202 may be, e.g., four or five pixels in length. Other shapes and sizes of the hover zone may be used. For example, the hover zone may be a cylinder with a constant X,Y radius about central normal axis 203 along the entire Z-dimension length of the hover zone. In any event, hover zone may preferably be sized and shaped so as to have an effect that is subtle, if even noticeable, to the average user. Ideally, from the user's point of view, it simply appears easier to control targeting of stylus 166.

Once the hover zone has been defined, then at step 507 computer 100 again awaits another stylus input, which may be considered a new stylus input or a second portion of the original stylus hover input received at step 502. For example, each stylus input may be represented by an individual packet of data, for instance representing a sample "snapshot" of the stylus position. Or, instead of a single packet, each stylus input may be considered a series of such packets, for instance representing an entire stylus gesture or a portion thereof. At step 508, it is determined whether the stylus input is a stylus hover input or a stylus touch input. If it is a stylus hover input, then at step 509 the displayed cursor is again moved as in step 504. Then, at step 510 computer 100 determines whether, after taking into account the latest stylus hover input, stylus 166 is still within the defined hover zone. If so, then at step 507 computer 100 awaits the next stylus input. However, if stylus 166 has moved outside of the defined hover zone, then the process starts over at step 502. The reason for this is that, if stylus 166 has moved outside the hover zone, then it is likely that the user has not yet selected a likely touchdown target. This means that the previously-defined hover zone is no longer needed, and a new hover zone will be defined the next time a hover pause is detected.

Assuming that stylus 166 has remained within the hover zone, then step 507 is repeated. Eventually, and assuming that stylus 166 has continually remained within the hover zone, at step 508 computer 100 will detect a stylus touch input. This means that the user has lowered stylus 166 until it physically contacts touch-sensitive surface 201. For example, the user may have performed a tap by lowering stylus 166 until it physically contacts touch-sensitive surface 201 and then removes stylus 166 from touch-sensitive surface 201. Alternatively, the user may have lowered stylus 166 until is physically contact touch-sensitive surface 201 and then maintained the contact. Either way, at step 511 computer 100 may determine whether the initial point of contact is within a defined touch zone (such as touch zone 402 in FIG. 4). The touch zone may depend upon the hover zone, and may be a projection along the Z dimension of the hover zone or the intersection of the hover zone with touch-sensitive surface 201. If the initial point of contact is not within the touch zone, then the stylus touch input may be processed in a conventional manner. For example, any action, such as a left or right click, that may conventionally occur responsive to the stylus touch input may be directed to the initial point of contact.

However, if the initial point of contact is within the touch zone, then the hover pause location may be used at steps 512 and/or 513. More particularly, the displayed cursor may be moved to a location corresponding to the hover pause location, which in the case of an integrated touch-sensitive display may be the Z dimension projection of the hover pause location onto touch-sensitive surface 201. Also, any action that may conventionally occur responsive to the stylus touch input may occur, not necessarily at the initial point of contact, but instead at the location corresponding to the hover pause location, which again in the case of an integrated touch-sensitive display may be the Z dimension projection of the hover pause location onto touch-sensitive surface 201. Thus, by pausing stylus 166 in mid-air prior to touching down, the user may accurately control, a priori, the location where an action is to be sent responsive to the subsequent touchdown.

Figure 6:
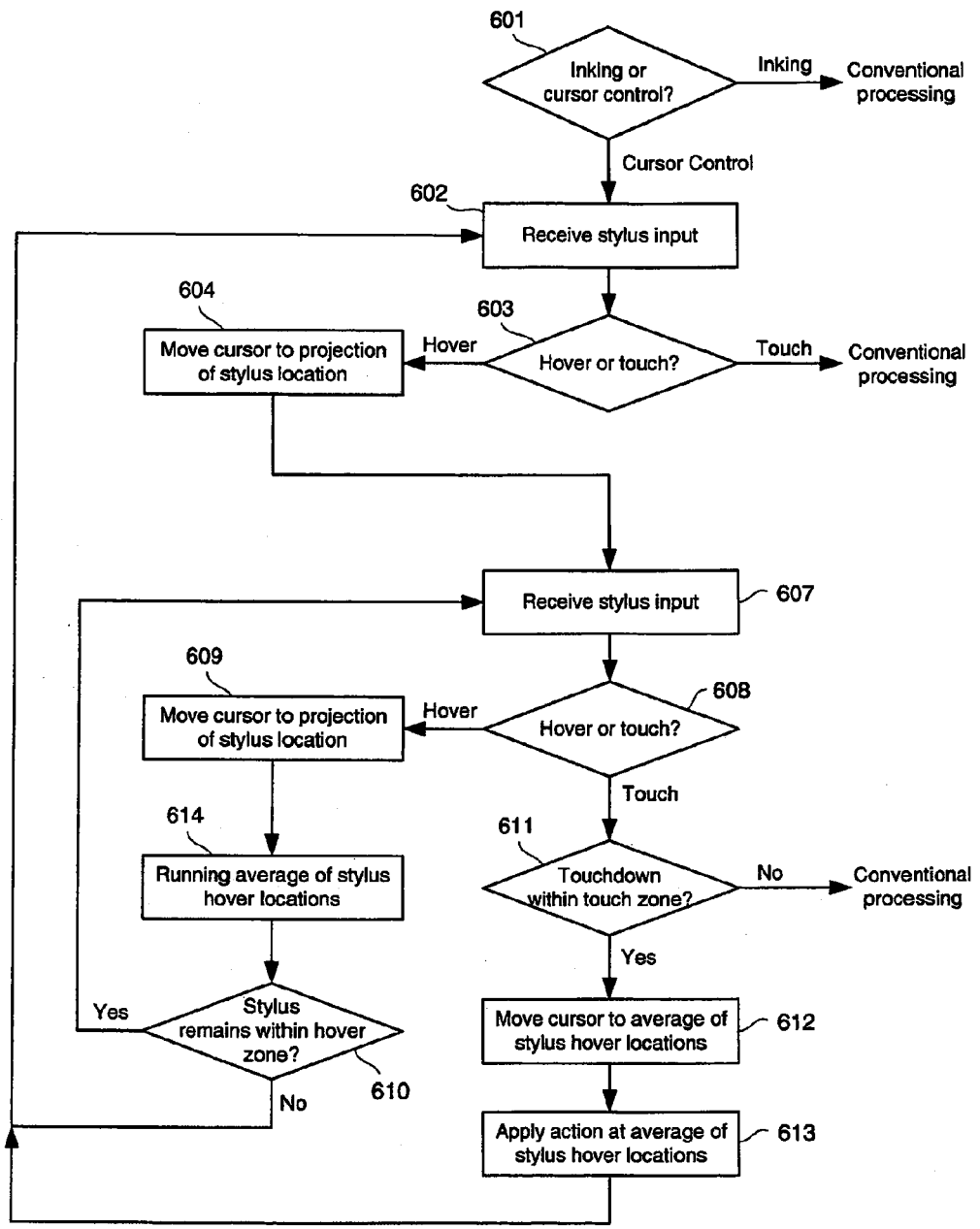

Modifications to the method shown in connection with FIG. 5 are possible. For example, FIG. 6 shows an illustrative embodiment where the user need not pause stylus 166 in midair prior to touching down. Instead, a running average or other function of historical stylus hover positions in an X,Y plane is used to determine where an action should be directed. The running average may be reset upon a touchdown of stylus 166. Also, the running average may be taken over a fixed or dynamic size moving window. Steps 601 to 604 are identical to steps 501 to 504. Then, instead of detecting a pause and defining a hover zone, at step 607 the next stylus input is received. Steps 607 to 609 are identical to steps 507 to 509. Then, at 614, a running average of the stylus hover location is maintained. Instead of or in addition to a running average, other statistical functions may be applied (e.g., running median) to the plurality of stylus hover locations.

Next, steps 610 and 611 are identical to steps 510 and 511, except that in this embodiment, the concept of a hover zone is approached differently. In this embodiment, the current stylus hover location is compared with the running average (and/or result of some other function) applied to the previous stylus hover locations. The determination of whether the stylus has remained within the hover zone is based on the comparison. For example, if stylus 166 has moved more than a threshold distance along an X,Y plane from the running average, then computer 100 may determine that stylus 100 has left the hover zone. Likewise, if stylus 166 is located within a threshold distance along an X,Y plane from the running average, then computer 100 may determine that stylus 100 has remained within the hover zone. In a sense, the hover zone is dynamically updated in this embodiment each time the running average or other function is updated.

Steps 612 and 613 are identical to steps 512 and 513, except that in this embodiment, the cursor (e.g., cursor 401) and/or any action taken responsive to the stylus touch input is directed to a location corresponding to the running average (and/or result of some other applied function). In the case of an integrated touch-sensitive display, this location may be the Z dimension projection of the running average onto touch-sensitive surface 201.

Another illustrative modification includes using look-back logic to choose an historical X,Y location as the location to which the cursor should be moved and/or an action should be directed upon stylus touchdown. This embodiment would be similar to the embodiment discussed in connection with FIG. 5, but instead of choosing an historical X,Y location based on a hover pause location, it may be chosen based on one or more other factors. For example, assume that a series of X,Y stylus position packets are recorded over time. Which one of those historical X,Y stylus location is chosen upon touchdown may be based on the velocity of stylus movement, such as at the moment that the stylus pulls away from the touch-sensitive surface or the moment of touchdown. In such an embodiment, for example, the slower the stylus moves at or near touchdown, the earlier in time the chosen historical stylus X,Y location.

Figure 7:
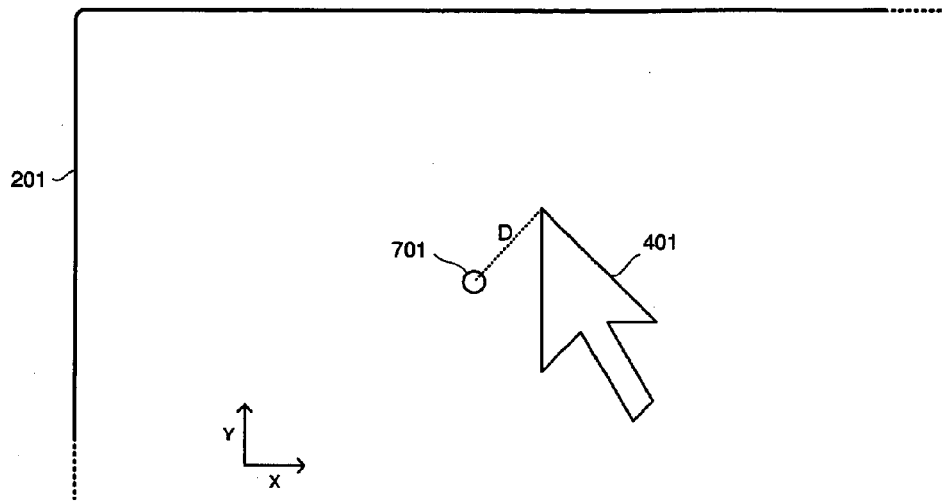
FIGS. 7 and 8 are each plan views of an illustrative touch-sensitive device integrated with a display.

In addition to or instead of the above-discussed techniques, the positioning of the displayed cursor may be dampened or even prohibited in such a way that may be helpful to the user in controlling cursor position. Referring to the illustrative embodiment shown in FIG. 7, a plan view of a portion of touch-sensitive surface 201 is shown, in which it is integrated with a display such as monitor 191. Cursor 401 is displayed at a location on touch-sensitive surface 201. In addition, although not necessarily displayed to the user, the Z dimension projection of the location of hovering stylus 166 is depicted in FIG. 7 as a circle 701, which will be referred to hereafter as stylus projection location 701. Although stylus projection location 701 may be at the same location as cursor 401, it is shown as being located a distance D in the X,Y plane from cursor 401. This distance D may be used to determine whether any cursor movement dampening should occur, and if so, how much. This distance D may also be used to determine whether cursor movement should be prohibited.

Under conventional circumstances (i.e., without any aspects of the present invention), cursor 401 would follow every X,Y movement of stylus 166 while it is within hovering range. However, in accordance with aspects of the present invention, movement of cursor 401 may sometimes be dampened such that movement of cursor 401 does not necessarily follow movement of stylus 166 while it is within hovering range. In effect, a low-pass filter may be selectively applied to cursor control such that cursor 401 lags somewhat behind stylus 166. Such dampened movement may appear to the user as though cursor 401 is moving through molasses. To a limited extent, this lag may become greater as stylus 166 moves slower. The amount of dampening and/or lag may depend upon the location of the stylus projection location 701 relative to cursor 401.

Figure 8:
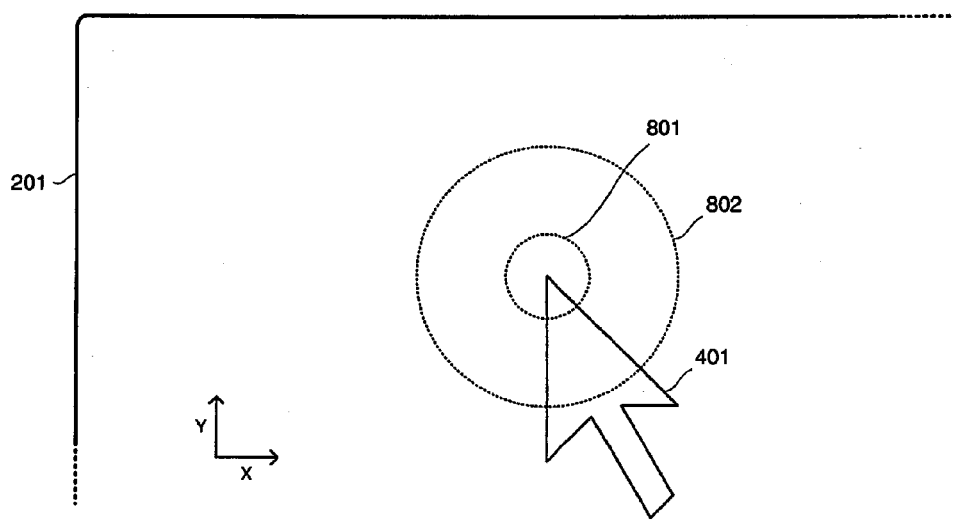

To implement such dampening and/or cursor movement prohibition, one or more cursor control zones may be defined relative to cursor 401. Although not necessarily displayed to the user, two such zones, 801 and 802, are shown in FIG. 8. In this illustrative embodiment, inner zone 801 and outer zone 802 are each a disk centered about cursor 401. Outer zone 802 may overlap inner zone 801 or it may be in the form of an annulus that does not overlap inner zone 801. In any event, a cursor control zone may be of any shape and size, and may be located anywhere relative to cursor 401.

In this particular embodiment, inner cursor control zone 801 is a "dead zone," meaning that cursor control made in the dead zone does not affect cursor movement. A purpose of this dead zone may be to absorb noise and shaky hand movements. The dead zone may be particularly useful in helping a user target small objects. Thus, while stylus projection location 701 is located within dead zone 801, movement of stylus 166 does not result in any movement of cursor 401. Dead zone 801 may be small enough for the user to not take much notice, such as only a one or two pixels in radius. However, dead zone 801 may be of any size and shape.

Also in this particular embodiment, outer cursor control zone 801 is a dampening zone, meaning that cursor control made in the dampening zone results in dampened cursor movement. Thus, while stylus projection location 701 is located within dampening zone 802, movement of stylus 166 results in movement of cursor 401 that is dampened with respect to movement of stylus 166. The amount of dampening may be constant throughout dampening zone 802, it may depend upon the distance D between projection location 701 and cursor 401, or it may depend upon the size of dampening zone 802. For example, the larger dampening zone 802 is, the more dampening that will be provided within dampening zone 802. Dampening zone 802 may be larger than dead zone 801, such as three to six pixels in diameter. In some embodiment, dampening zone 802 may be approximately three times larger than dead zone 801. In any event, dampening zone 802 may be of any size and shape. In addition, the size of dampening zone 802 may depend upon the velocity of stylus 166. For example, dampening zone 802 may grow larger when stylus 166 moves slowly while hovering, and may shrink responsive to stylus 166 moving faster while hovering. Growth and/or shrinkage of dampening zone 802 may be limited, however. For example, dampening zone 802 may be prevented from being larger than 32 pixels in radius, or any other size limit, and dampening zone 802 may be prevented from shrinking below a predetermined small size limit. In addition, there may be an asymmetry to dampening zone 802 growth and shrinkage. For instance, there may be a bias such that it is easier to shrink dampening zone 802 than to grow it. This represents a typical behavior in which users often take their time to perform fine targeting (where dampening zone 802 would grow larger, thereby making cursor movements smoother as it grows) but move their stylus quickly to a different portion of in order to perform a tap or a drag on a particular object. In the latter case, it may be desirable for dampening zone 802 to shrink quickly so as to not interfere with the user's attempt to quickly relocate the displayed cursor.

Also in this particular embodiment, whenever stylus projection location 701 is located outside of both cursor control zones 801 and 802, then cursor 401 moves in an undampened conventional manner in response to stylus hover input. Alternatively, movement of cursor 401 may still be dampened, but by an amount that is less than when stylus projection location 701 is within dampening zone 802. In the latter case, dampening may be at a constant level outside of cursor control zones 801 and 802, or may depend upon distance D.

Combining the above-discussed look-back logic with dampening zone 802, an amount of look-back f that may be performed may be computed as, for example:

$$f=0.05+(CT-minCT)*(0.98-0.05)/(maxCT-minCT),$$

wherein CT is the current size of dampening zone 802, and minCT and maxCT are, respectively, the minimum and maximum allowable size of dampening zone 802. The minimum allowable size minCT may be of any value no greater than maxCT, such as 3. Of course, the various constants used above (e.g., 0.98 and 0.05) and in the remaining equations are merely illustrative; other values may be used.

Next, the number of packets to look back may be computed as:

$$number\_of\_packets\_to\_look\_back=f*LB,$$

wherein LB is a "look back" value. The value of LB may be set by the user and/or by software, and may be of any value. In an illustrative embodiment, LB has a default value of 15 and can range from 1 to 30. The amount of time to look back may then be computed as:

$$time\_to\_look\_back=number\_of\_packets\_to\_look\_back*1000/133,$$

which results in the number of milliseconds of lag for the cursor movement, assuming in this example that 133 packets per second of stylus input data are generated.

To determine the size of dead zone 801, the following computation may be used:

$$dead\_zone=CT*DZ/(2*100),$$

wherein CT is the current size of dampening zone 802 and DS is a dead zone size setting that may be set by the user or by software and may be of any value between 0 and 100. For example, where DZ is equal to 33, this would mean that dead zone 801 is generally about one-third of the size of dampening zone 802.

To provide dampening of movements of cursor 401, the following computation may be used:

$$xCursorNew=Xi*xCursorOld+(1-Xi)*xCurrent, and$$

$$yCursorNew=Xi*yCursorOld+(1-Xi)*yCurrent,$$
wherein $$Xi=0.5+(CT-minCT)*(0.98-0.5)/(maxCT-minCT).$$

Each new cursor 401 location will have the screen coordinates xCursorNew, yCursorNew, which may be computed based on its previous screen coordinates xCursorOld, yCursorOld, its current screen coordinates xCurrent, yCurrent, and the current, minimum, and maximum sizes (CT, minCT, and maxCT, respectively) of dampening region 802.

To determine the current size CT of dampening zone 802, the following illustrative algorithm may be used. The value of CT may change based on a "really slow" flag, an "increase trigger" value, and a "decrease trigger" value. The "really slow" flag is set responsive to stylus 166 moving below a given velocity threshold while hovering, otherwise it is un-set. If the "really slow" flag is set, then a "hover" value is increased by one for each new stylus input packet. Each time the "hover" value exceeds the "increase trigger" value, CT is incremented by one (thereby increasing the current size of dampening zone 802) and the "hover" value is reset to zero. The "increase trigger" value may be set by the user or by software and may be of any value such as in the range of 1 to 30 with a default value of 3.

The previous paragraph contemplates the situation where dampening zone 802 can grow. In addition, to allow for dampening zone 802 to shrink when appropriate, for each stylus input packet, an "anti-hover" value is incremented by one. This is true regardless of the state of the "really slow" flag. Each time the "anti-hover" value exceeds the "decrease trigger" value, CT is decremented by one (thereby decreasing the size of dampening zone 802) and the "anti-hover" value is reset to zero. The "decrease trigger" value may be set by the user or by software and may be of any value, such as in the range of 1 to 30 with a default value of 12. The "decrease trigger" value should be larger than the "increase trigger" value so that dampening zone 802 is able to grow when stylus 166 moves slowly. The result of this algorithm is that dampening zone 802 has hesitant growth (which is a force that is applied to dampening zone 802 when stylus 166 moves slowly) and determined shrinkage (which is a force that is always applied to dampening zone 802).

To determine the setting of the "really slow" flag, the following computation may be used:

$$DistSqCur=dX+dY*dY,$$

$$AvgDistSq=0.7*AvgDistSqOld+(1-0.7)*DistSqCur,$$
such that $$really\_slow=AvgDistSq<3.$$

Thus, in this illustrative embodiment, the "really slow" flag is set (i.e., equal to true) whenever the average distance covered per stylus input packet is less than the square root of three, otherwise it is un-set (i.e., equal to false).

Figure 9:
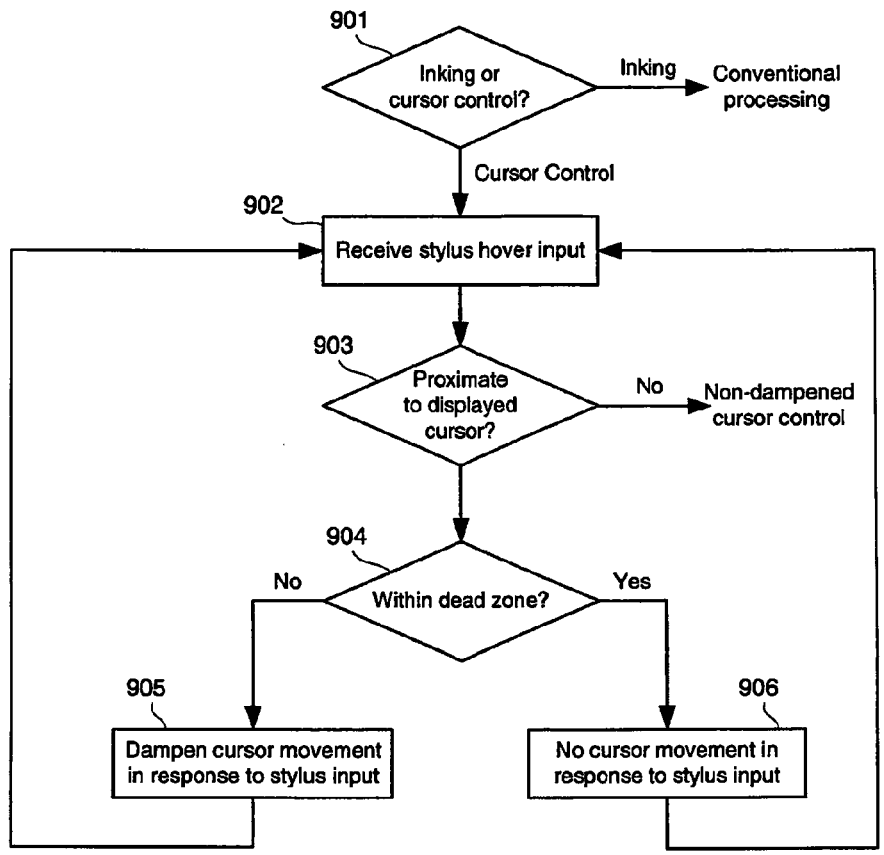
FIG. 9 is a flowchart showing an illustrative method for implementing various aspects of the present invention.

FIG. 9 shows an illustrative method that may be used in connection with cursor dampening and deadening. At step 901, computer 100 determines whether it is in a cursor control mode or an inking mode. In the present example, dampening and deadening can only occur when computer 100 is in cursor control mode. However, dampening and/or deadening may be implemented in inking mode if desired. Next, at step 902, and assuming that cursor control mode is active, a stylus hover input is received. At step 903, computer 100 determines whether stylus projection location 701 is sufficiently proximate to cursor 401. For example, computer 100 may determine whether stylus projection location 701 is within dampening zone 802. If not, then non-dampened cursor movement may occur.

However, if stylus projection location 701 is sufficiently proximate to cursor 401, then cursor movement is eligible to be dampened. In this case, computer 100 then determines at step 904 whether stylus projection location 701 is within a dead zone such as dead zone 801. If not, then at step 905 cursor 401 is moved in a dampened manner in response to the stylus hover input. If so, then at step 906 movement of cursor 401 is not affected at all by the stylus hover input. It should be noted that a dead zone may be implemented at all times or only when cursor 401 is already motionless.

It should also be noted that cursor control zones may be used with input devices other than a stylus and touch-sensitive device. For example, cursor control zones may be used when cursor 401 is controlled by a mouse or trackball device. Also, various aspects of the present invention may be used not only when stylus 166 is providing stylus hover input, but also when stylus 166 is providing stylus touch input, as desired. Many of the approaches discussed herein also apply to a stylus drag input, which is where the stylus is moving across the touch-sensitive surface while it continues to physically contact the touch-sensitive surface. For instance, although dampening and deadening of the displayed cursor have been discussed above with regard to a stylus hover input, these may also occur in response to a stylus drag input. A stylus drag input may be used to implement drag-targeting, for example, which is where the user is attempting to accurately target a particular displayed element before lifting the stylus up away from the touch-sensitive surface. Such stylus drag input may occur immediately after the above-discussed stylus touch input that, in turn, follows the prior stylus hover input. Also, stylus drag input may be used to implement inking, such as when the user desires to write handwritten text or draw a picture. In such an inking situation, it may be undesirable to cause the cursor position to be dampened and/or deadened during a stylus drag input. It may further be undesirable where the user is attempting to accurately adjust the size, shape, or location of a displayed item (such as in a drawing application). Thus, dampening and/or deadening of the displayed cursor may be manually turned on/off by the user and/or automatically by the computer as it senses the appropriateness and context of these features.

Thus, various techniques have been described that may provide the user with an easier-to-control graphical user interface. Various aspects of the present invention have been described in terms of steps and methods. Each of these steps and methods may be embodied as computer-executable instructions stored on a computer-readable medium.

What is claimed is:

1. A computer-readable memory device storing computer-executable instructions that, when executed, enable a computing device to perform a method of receiving an input using a touch-sensitive surface, the method comprising:
   detecting a plurality of hover positions of an input device while the input device is positioned apart from the touch-sensitive surface;
   based on the plurality of hover positions, calculating a running-average hover position, which is deemed a projected location on the touch-sensitive surface;
   receiving a touch input, which indicates that the input device physically contacted the touch-sensitive surface at a touch location, wherein the touch location is different than the projected location; and
   responsive to the touch input, invoking an action corresponding to the projected location.

2. The computer-readable memory device of claim 1, wherein the action includes an action in a graphical user interface.

3. The computer-readable memory device of claim 1,
   wherein the method comprises determining a touch zone of the touch-sensitive surface,
   wherein, when the touch location is within the touch zone, the action corresponds to the projected location, and
   wherein, when the touch location is outside the touch zone, the action corresponds to the touch location.

4. The computer-readable memory device of claim 3, wherein a size of the touch zone is a multiple of a size of the projected location.

5. The computer-readable memory device of claim 4, wherein the size of the projected location is one or more pixels and wherein the size of the touch zone is four or more pixels.

6. The computer-readable memory device of claim 1, a hover location includes a respective location on the touch-sensitive surface that is captured at a respective instant in time as the input device is moved through a series of positions while the input device is positioned apart from the touch-sensitive surface.

7. The computer-readable memory device of claim 6, wherein the projected location includes a running median of the plurality of hover locations.

8. The computer-readable memory device of claim 6,
wherein, when the touch location is less than a threshold distance from the projected location, the action corresponds to the projected location, and
wherein, when the touch location is more than a threshold distance from the projected location, the action corresponds to the touch location.

9. The computer-readable memory device of claim 1,
wherein determining the projected location includes detecting a plurality of hover locations over a period of time,
wherein each hover location includes a respective location on the touch-sensitive surface that is captured when the presence of the input device is detected at a respective instant in time during the period of time, and
wherein one of the hover locations is selected as the projected location.

10. The computer-readable memory device of claim 9, wherein the one of the hover locations is selected based on a velocity of a movement of the input device.

11. A computing device storing computer-executable instructions that, when executed, enable the computing device to perform a method of receiving an input using a touch-sensitive surface, the method comprising:
responsive to detecting a presence of an input device, which is positioned a distance apart from the touch-sensitive surface, determining a projected location on the touch-sensitive surface;
determining a touch zone of the touch-sensitive surface,
wherein a size of the touch zone is determined by a base of a three-dimensional figure, and
wherein a size of the three-dimensional figure is based on a distance of the input device from the touch-sensitive surface;
receiving a touch input, which indicates that the input device physically contacted the touch-sensitive surface at a touch location, wherein the touch location is different than the projected location;
when the touch input is outside the touch zone, invoking an action corresponding to the touch location; and
when the touch input is inside the touch zone, invoking an action corresponding to the projected location.

12. The computing device of claim 11, wherein the size of the touch zone is a multiple of a size of the projected location.

13. The computing device of claim 12, wherein the size of the projected location is one or more pixels and wherein the size of the touch zone is four or more pixels.

14. The computing device of claim 11, wherein, when the input device is detected outside the three-dimensional figure, the action corresponds to the touch location.

15. The computing device of claim 11, wherein, when the input device is not detected outside the three-dimensional figure, the action corresponds to the projected location.

16. A method of receiving an input using a touch-sensitive surface, the method comprising:
responsive to detecting a presence of an input device, which is positioned a distance apart from the touch-sensitive surface, detecting a plurality of hover locations over a period of time,
wherein a hover location includes a respective location on the touch-sensitive surface that is captured at a respective instant in time as the input device is moved through a series of positions while the input device is positioned apart from the touch-sensitive surface, and
wherein a projected location is calculated and includes a running average of the plurality of hover locations or a running median of the plurality of hover locations;
receiving a touch input, which indicates that the input device physically contacted the touch-sensitive surface at a touch location, wherein the touch location is different than the projected location; and
responsive to the touch input, invoking an action corresponding to the projected location.

17. The method of claim 16,
wherein, when the touch location is less than a threshold distance from the projected location, the action corresponds to the projected location, and
wherein, when the touch location is more than a threshold distance from the projected location, the action corresponds to the touch location.

* * * * *